Oct. 10, 1967  F. M. RICCI  3,346,137
RECEPTACLE
Filed April 9, 1965  3 Sheets-Sheet 1
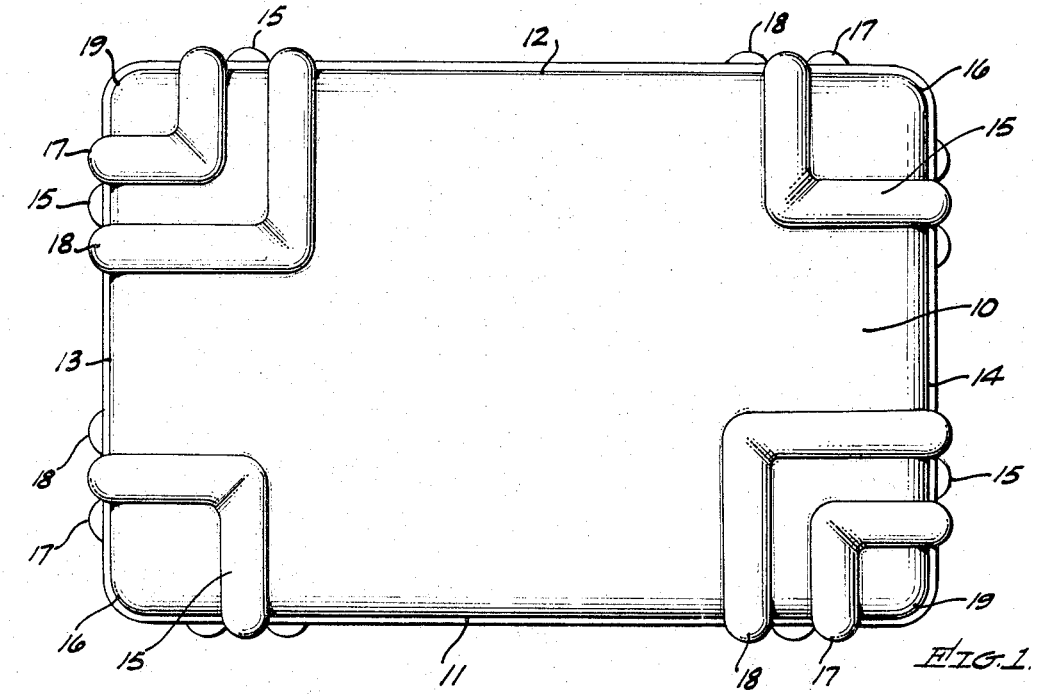
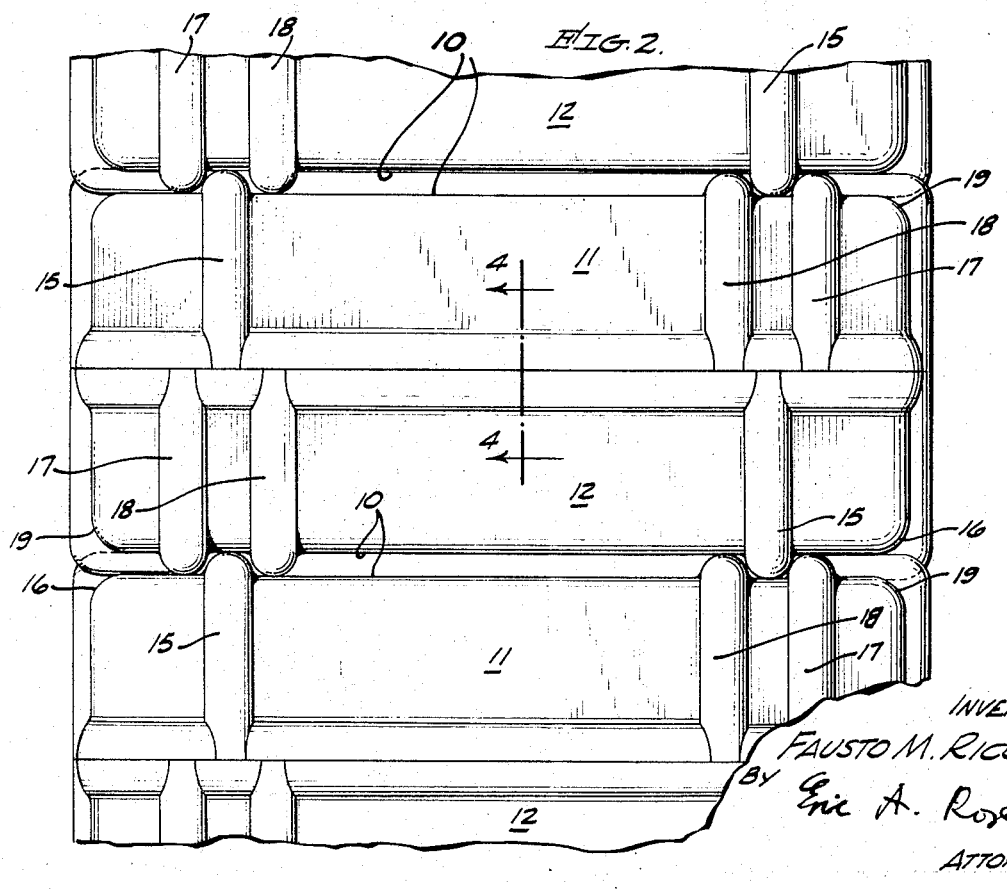
INVENTOR.
FAUSTO M. RICCI,
BY Eric A. Rose
ATTORNEY.

Oct. 10, 1967     F. M. RICCI     3,346,137
RECEPTACLE
Filed April 9, 1965     3 Sheets-Sheet 2
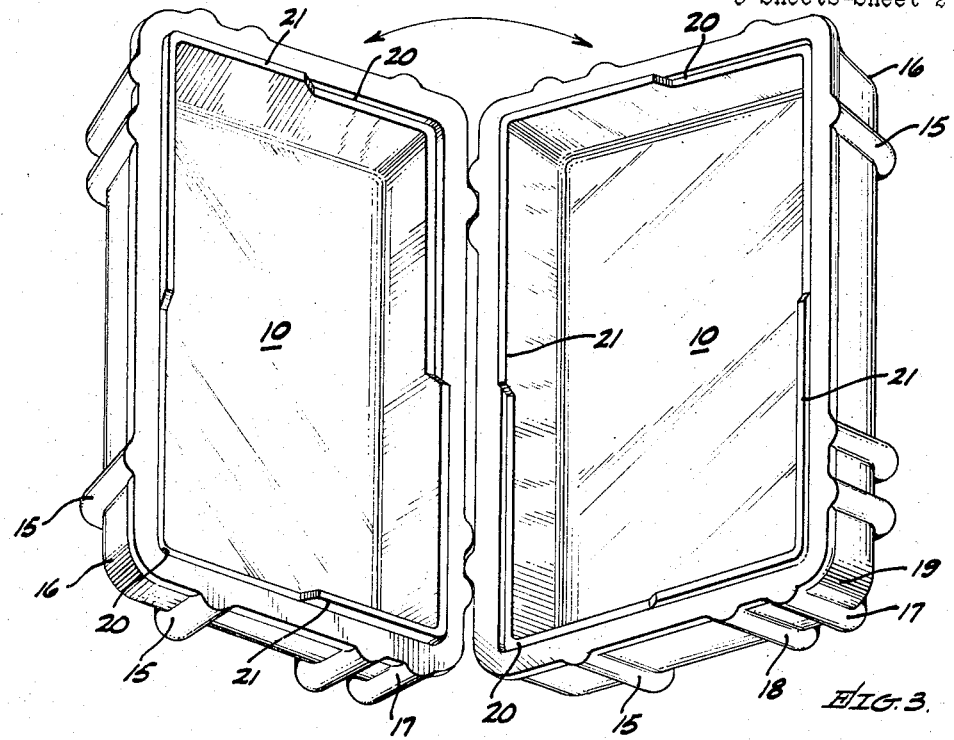
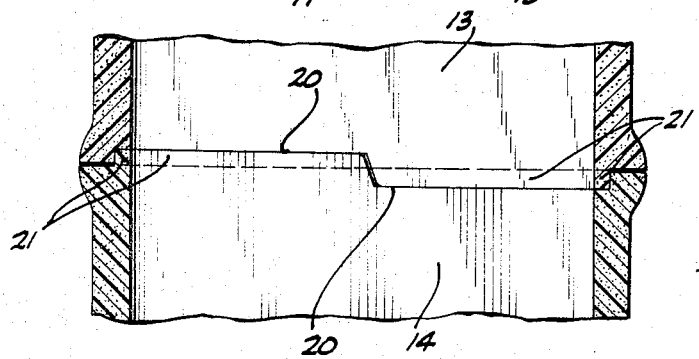
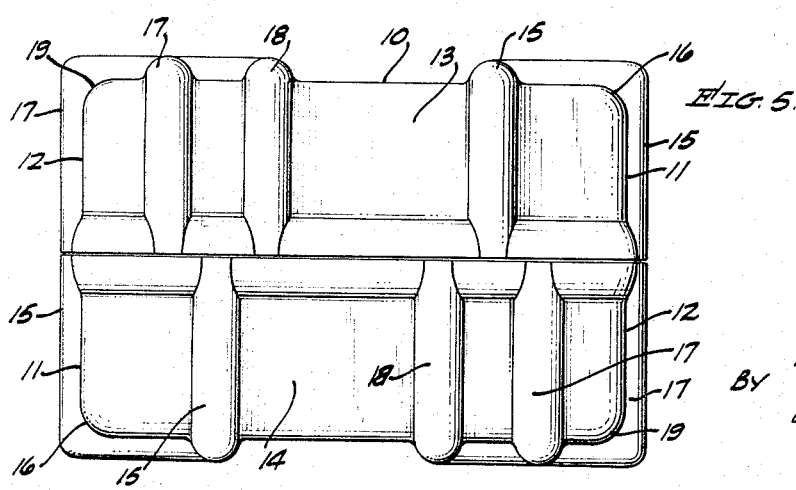
INVENTOR.
FAUSTO M. RICCI,
BY Eric A. Rose
ATTORNEY.

United States Patent Office 3,346,137
Patented Oct. 10, 1967

3,346,137
RECEPTACLE
Fausto M. Ricci, 1090 Carolyn Way,
Beverly Hills, Calif. 90210
Filed Apr. 9, 1965, Ser. No. 446,874
7 Claims. (Cl. 220—23.6)

ABSTRACT OF THE DISCLOSURE

A receptacle manufactured of thermoplastic material permitting vertically and horizontally interlocking multiple stacking by means of parallel spaced L-shaped ridges joined to the base, side walls and end walls of the receptacle about each corner thereof, such L-shaped ridges communicating with other identically constructed receptacles placed adjacent to the receptacle.

My invention relates to the improvement in a receptacle, and particularly lightweight receptacles manufactured of expanded polystyrene or other thermoplastic material provided with interlocking features for efficient handling and compact storage; and the objects of my invention are, first, to provide a receptacle manufactured of thermoplastic or equivalent material suitable for interlocking multiple use which will permit the doubling of storage space when interlocked vertically and permit compact storage when interlocked horizontally and vertically; second, to provide a receptacle having affixed to the outside thereof interlocking features permitting the horizontal interlocking of similar receptacles placed adjacent thereto; third, to provide a receptacle having interlocking features applied to the top edge portion thereof to facilitate the positioning of a second receptacle of identical construction in vertical alignment with the first receptacle to form an enclosed cavity; fourth, to provide a receptacle manufactured of expanded polystyrene or other thermoplastic material which can be cheaply produced and easily assembled with receptacles of identical construction for the purpose of providing bulk storage space in an enclosed cavity; and fifth, to provide a receptacle for the storage of bulk material having interlocking features permitting it to be interlocked vertically and horizontally with receptacles of identical construction in vertical and horizontal stacks in a safe and stable manner.

Additional objects, together with further advantages derived in utilizing the present invention will become apparent from the following detailed description thereof taken together with the accompanying drawings forming part of the specification in which—

FIGURE 1 is a plane view of two of my receptacles placed apposite to each other in vertical alignment;

FIGURE 2 is a side elevational view of a plurality of my receptacles in vertical alignment and interlocked by means of the ridges forming part of my invention;

FIGURE 3 is a view in the perspective showing the cavity of two receptacles in the process of being placed in inverted vertical alignment;

FIGURE 4 is a fragmentary enlarged cross-sectional view of my invention taken on line 4—4 of FIGURE 2 and showing a fragmentary portion of the top edge of two receptacles placed in inverted vertical alignment;

FIGURE 5 shows an end view of two of my receptacles placed in inverted vertical alignment.

Similar numerals refer to similar parts throughout the several views.

Figure 6:
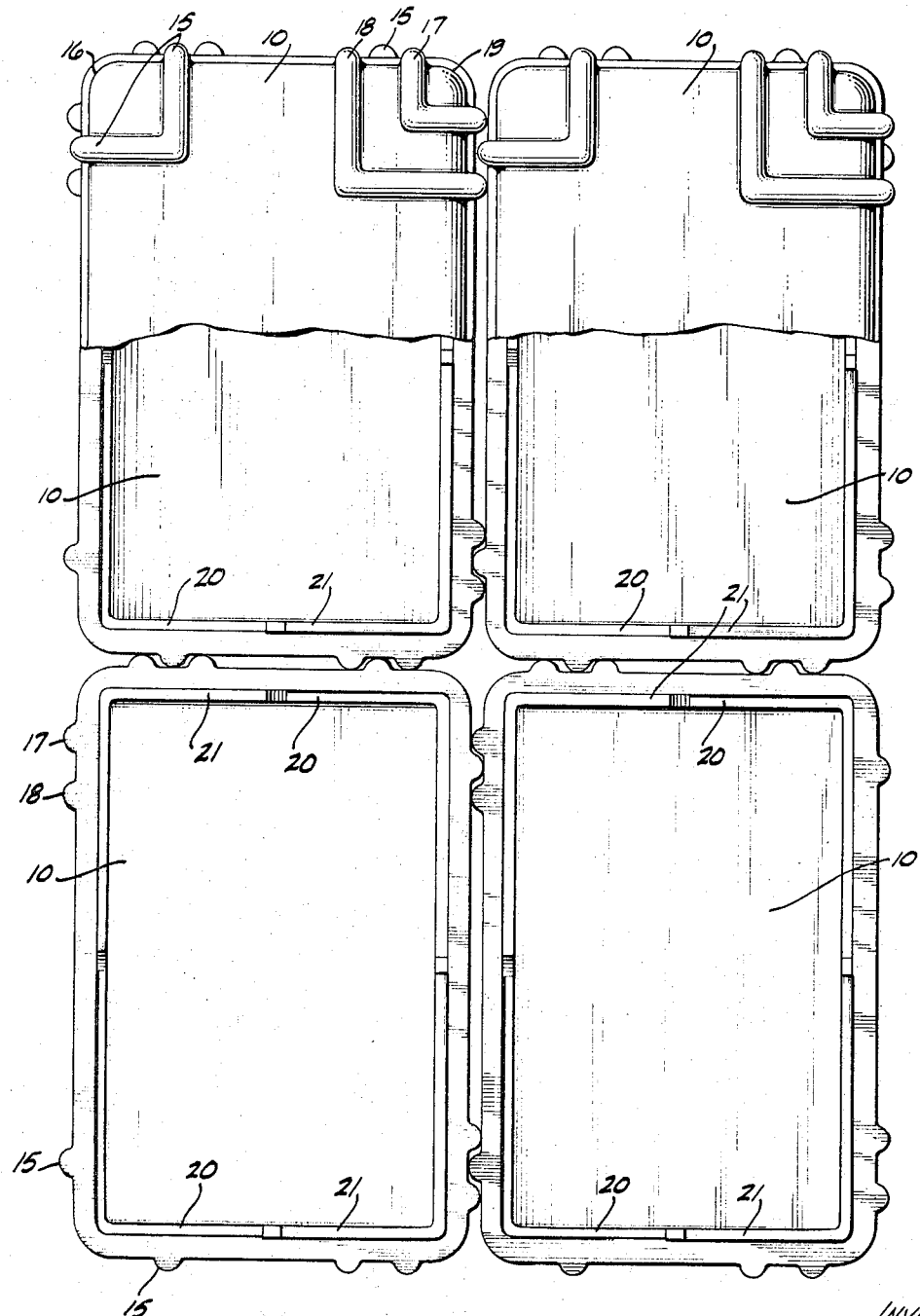
FIGURE 6 is a top view partially broken away showing four receptacles aligned horizontally and interlocked with each other and a portion of two receptacles placed in inverted vertical alignment with two of the aforementioned receptacles.

My invention, described in the accompanying drawings, includes generally a base 10, side walls 11, 12 extending vertically from said base and joined integrally thereto and end walls 13, 14 extending vertically from said base and integrally joined to said base and to said side walls 11, 12 to form a cavity of substantially rectangular shape. One end wall 13 is joined vertically with the side walls 11, 12 to form vertical corners 16, 19, and the other end wall 14 is vertically joined with the side walls 11, 12 to form vertical corners 19, 16.

The free ends of the side walls and end walls form a continuous edge which is expanded outwardly enlarging the width thereof into a flat horizontal surface.

Two semi-cylindrical L-shaped ridges 15, one being integrally joined to a side wall 11, and one being integrally joined to an end wall 13, at equal distance from a corner 16, formed by said side wall and end wall, extend vertically downwardly from the edge of the receptacle under the base 10, and are integrally joined to the base and to each other at substantially right angle to each other at the ends of the short leg of said L-shaped ridges 15. Two other semi-cylindrical L-shaped ridges 15 are identically arranged about the vertical corner 16, formed by the side wall 12 and the end wall 14, and disposed diagonally to the vertical corner 16, formed by the side wall 11 and the end wall 13.

Two semi-cylindrical L-shaped ridges 17, 18, spaced parallel to each other a predetermined distance apart, integrally joined to a side wall 11, and two semi-cylindrical L-shaped ridges 17, 18, spaced parallel to each other a predetermined distance apart from each other, being integrally joined to the end wall 14, each set of parallel ridges being equidistant from the vertical corner 19, formed by the side wall 11 and the end wall 14, extend vertically downwardly from the edge of the receptacle under the base 10, and are integrally joined to the base, the semi-cylindrical L-shaped ridges 17, nearest the corner 19, being joined to each other on said base 10 at substantially right angle at the ends of the short leg of said ridges 17, and the ridges 18, parallel thereto, being joined at substantially right angle to each other on said base 10 at the ends of the short leg of said ridges 18.

The semi-cylindrical L-shaped ridges 17, 18 are spaced a predetermined distance apart from each other so that the space therebetween will permit the positioning between said ridges of the raised portion of a corresponding semi-cylindrical L-shaped ridge 15 when placed in interlocking position with any other receptacle.

Two other sets of semi-cylindrical L-shaped ridges 17, 18 are identically arranged about the vertical corner 19, formed by the side wall 12 and the end wall 13, and disposed diagonally to the vertical corner 19, formed by the side wall 11 and the end wall 13.

A depression 20 is provided in the inside margin of the flat horizontal surface of the continuous edge formed by the side walls 11, 12 and the end walls 13,14, extending from the center of the side wall 11 to the center of the end wall 13, and a second depression 20 is provided in the inside margin of the flat horizontal surface of the continuous edge extending from the center of the side wall 12 to the center of the end wall 14.

A raised rib 21, having sloping ends, is provided at the inner margin of the remaining flat horizontal surface, extending from the center of the side wall 12 to the center of the end wall 13, and a second raised rib 21 extends similarly from the center of the side wall 11 to the center of the end wall 14.

In my invention, the distance of the longitudinal center of the single ridge to its adjacent vertical corner is the same as the distance of the longitudinal center line of the space between parallel ridges to an adjacent corner,

3 and the space between parallel ridges is determined so as to provide a snug fit with the external portion of a single ridge of a different receptacle placed apposite thereto.

The external shape of the ridges may be varied to fit a particularly desired application.

In use, the receptacle may be covered by a lid not shown in the drawings, comprising a flat sheet designed to fit the top of the receptacle of a thickness equal to the depression 20 in the horizontal flat surface of the continuous edge of the receptacle, and provided with cutouts to permit its positioning adjacent to the raised ribs 21 of the receptacle.

When it is desired to double the volume of the receptacle, a second receptacle is horizontally inverted and placed upon the first receptacle in such a manner that the flat horizontal surface of the continuous edge of each receptacle is placed apposite to the other. In that manner a closed box is formed, in which the raised ribs of the continuous edge of one receptacle are placed adjacent to the depressions in the continuous edge of the other receptacle.

If it is desired to interlock, for stacking purposes, a plurality of receptacles horizontally or vertically, a box-like structure is formed, comprising pairs of receptacles, disposed as hereinabove described, and boxes are placed in apposition to each other so as to dispose the external portion of any single ridge in the space between parallel sets of ridges of corresponding side walls or end walls, respectively, giving thereby the interlocked receptacles lateral, as well as vertical stability. If boxes are stacked vertically, they will be alternately horizontally inverted to permit the position of the external portion of single ridges into the space between parallel ridges, as described above.

It is understood that various forms of my invention may be used or utilized embodying the principles of my invention without departing from the spirit of my invention.

I claim:

1. A receptacle of the class described including a base, side walls extending vertically from said base and joined integrally thereto, end walls extending vertically from said base and joined integrally thereto and to said side walls forming vertical corners between each side wall and each end wall and forming a continuous edge with said side walls expanded outwardly to enlarge the width thereof into a flat horizontal surface having an inside margin, raised ribs integrally affixed to said inside margin and alternating with depressions in said inside margin, an L-shaped ridge integrally joined to one side wall, an L-shaped ridge integrally joined to an end wall, such ridges being equidistant from a corner formed by said side wall and said end wall and extending vertically downwardly from the continuous edge under said base and joined integrally to said base and to each other at substantially right angle at the ends of the short leg of said L-shaped ridges, an L-shaped ridge integrally joined to the other side wall, an L-shaped ridge integrally joined to the other end wall, such ridges being equidistant from a corner disposed diagonally from the first named corner, and extending vertically downwardly from the continuous edge under said base and joined integrally to said base and to each other at substantially right angle at the ends of the short leg of said L-shaped ridges, two L-shaped ridges spaced parallel to each other a predetermined distance apart integrally joined to a side wall, two L-shaped ridges spaced parallel to each other a predetermined distance apart integrally joined to an end wall, each set of parallel ridges being equidistant from each vertical corner adjacent to the vertical corners hereinabove described and extending vertically downwardly from the continuous edge under the base and integrally joined to the base, the L-shaped ridges nearest such corner being joined to the other ridge nearest said corner at substantially right angle at the ends of the short legs of said ridges and the ridges parallel thereto being joined at substantially right angle to each other on said base at the ends of the short legs of said ridges.

2. A receptacle of the class described including a base, side walls extending vertically from said base and joined integrally thereto, end walls extending vertically from said base and joined integrally to said base and to said side walls forming vertical corners between each side wall and each end wall, and parallel spaced L-shaped ridges disposed about and spaced equidistant from two of said corners disposed diagonally from each other protruding from said side walls and said end walls suitable to interlock with parallel spaced L-shaped ridges disposed and spaced equidistant about the corners of identical receptacles placed adjacent thereto.

3. A receptacle of the class described including side walls and end walls forming vertical corners with each other, parallel spaced L-shaped ridges spaced about and disposed equidistant from vertical corners disposed diagonally to each other, parallel spaced L-shaped ridges spaced about and disposed equidistant from the vertical corners adjacent to the first named vertical corners and a cover removably disposed upon said side walls and end walls having a top surface and downwardly extending sides, and parallel spaced L-shaped ridges disposed about and equidistant from vertical corners disposed diagonally to each other formed by the top surface and the downwardly extending sides which ridges extend downwardly upon said sides in vertical alignment with the space formed between parallel L-shaped ridges affixed to the side walls and end walls of the receptacle.

4. A receptacle of the class described including a substantially rectangular base, side walls integrally joined to the base and extending upwardly therefrom, end walls integrally joined to the base and to the side walls forming vertical corners therewith, a plurality of L-shaped ridges separated by parallel interspaces of equal width as said ridges affixed to the base about and equidistant from diagonally disposed corners and extending upwardly upon the side walls and end walls respectively, and a cover removably disposed upon said side walls and end walls having a top surface and downwardly extending sides and having parallel spaced L-shaped ridges disposed about and equidistant from diagonally spaced corners of said top surface and extending downwardly upon the sides of the cover in vertical alignment with the interspaces between the ridges disposed upon the side walls and end walls of the receptacle.

5. A receptacle of the class described including a substantially rectangular base, side walls integrally joined to the base and extending upwardly therefrom, end walls integrally joined to the base and to the side walls forming vertical corners therewith, and a plurality of L-shaped ridges separated by parallel interspaces of equal width as said ridges affixed to the base about and equidistant from diagonally disposed corners and extending upwardly upon the side walls and end walls respectively.

6. A receptacle of the class described including a substantially rectangular base, side walls integrally joined to the base and extending upwardly therefrom and having an L-shaped depression along the top edge thereof, end walls integrally joined to the base and to the side walls forming vertical corners therewith and extending upwardly from said base, and having an L-shaped depression along the top edge thereof in horizontal alignment with the depression in the top edge of said side walls, a plurality of parallel spaced L-shaped ridges having interspaces, the width of one ridge affixed to the rectangular base about and equidistant from diagonally spaced corners thereof and extending vertically upwardly upon the end walls and side walls, and a cover removably disposed in the depression along the top edge of the side walls and end walls having a substantially rectangular top surface and vertically downwardly extending sides integrally joined to said top surface and parallel spaced L-shaped ridges separated by interspaces of the width of one ridge affixed to the cover about and equidistant from diagonally disposed corners and extending vertically downwardly upon said sides in vertical alignment with the interspaces formed between parallel ridges affixed to the side walls and end walls of the receptacle.

7. A receptacle of the class described including a substantially rectangular base, side walls integrally joined to the base and extending vertically upwardly therefrom, end walls integrally joined to the base and to the side walls forming vertical corners with said side walls and said base, a plurality of parallel spaced L-shaped ridges separated by an interspace of the width of one ridge disposed about each of two diagonally spaced corners on said base equidistant therefrom and integrally joined to the base and extending vertically upwardly from said base and being integrally affixed to said side walls and end walls respectively, and a plurality of parallel spaced L-shaped ridges separated by an interspace equal to the width of one ridge disposed about each of the other two diagonally spaced corners of the base equidistant therefrom, said distance being equal to the distance of the first named corners to the nearest interspace between the first named L-shaped ridges and each of said ridges extending vertically upwardly upon said end walls and side walls.

References Cited
UNITED STATES PATENTS

| 2,848,151 | 8/1958 | Heil | 220—97 |
| 3,032,381 | 5/1962 | Boro | 220—97 X |
| 3,103,278 | 10/1963 | Kuzma | 220—23.6 |

FOREIGN PATENTS

| 1,302,210 | 7/1962 | France. |
| 572,551 | 1945 | Great Britain. |
| 624,766 | 9/1961 | Italy. |

JOSEPH R. LECLAIR, *Primary Examiner.*

GEORGE E. LOWRANCE, *Examiner.*